(12) United States Patent
Gassen et al.

(10) Patent No.: US 12,180,807 B1
(45) Date of Patent: Dec. 31, 2024

(54) HIGH FLOW, INSERT SAFETY VALVE, WELL PRESSURE INSENSITIVE

(71) Applicant: Halliburton Energy Services, Inc., Houston, TX (US)

(72) Inventors: Matthew Gassen, Carrollton, TX (US); James Dan Vick, Jr., Carrollton, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/535,388

(22) Filed: Dec. 11, 2023

(51) Int. Cl.
  *E21B 34/08* (2006.01)
  *F16K 1/32* (2006.01)
  *F16K 31/12* (2006.01)
  *F16K 31/122* (2006.01)

(52) U.S. Cl.
  CPC .......... *E21B 34/08* (2013.01); *F16K 1/32* (2013.01); *F16K 31/1225* (2013.01)

(58) Field of Classification Search
  CPC ........ E21B 34/08; E21B 34/10; E21B 34/101; E21B 34/105; E21B 34/106; F16K 1/32; F16K 31/1225
  See application file for complete search history.

(56) References Cited

U.S. PATENT DOCUMENTS

| | | | |
|---|---|---|---|
| 4,014,386 A | 3/1977 | Johnson et al. | |
| 4,021,137 A * | 5/1977 | Zehren | F04D 13/10 166/325 |
| 5,193,495 A | 3/1993 | Wood, III | |
| 9,631,456 B2 | 4/2017 | Vick, Jr. et al. | |
| 9,739,116 B2 * | 8/2017 | Kirkpatrick | E21B 34/106 |
| 9,810,039 B2 | 11/2017 | Vick, Jr. et al. | |
| 9,982,510 B2 | 5/2018 | Vick, Jr. et al. | |
| 10,030,475 B2 | 7/2018 | Vick, Jr. | |
| 10,113,392 B2 | 10/2018 | Vick, Jr. et al. | |
| 10,920,529 B2 * | 2/2021 | Mailand | E21B 41/0021 |
| 10,941,634 B2 | 3/2021 | Vick, Jr. | |
| 11,180,974 B2 | 11/2021 | Vick, Jr. et al. | |
| 11,661,820 B2 | 5/2023 | Dusterhoft et al. | |
| 2010/0025045 A1 | 2/2010 | Lake et al. | |
| 2013/0032356 A1 | 2/2013 | Scott et al. | |
| 2014/0000870 A1 | 1/2014 | Vick, Jr. et al. | |
| 2015/0218907 A1 | 8/2015 | Vick, Jr. | |
| 2016/0258250 A1 | 9/2016 | Vick, Jr. et al. | |
| 2016/0273304 A1 | 9/2016 | Vick, Jr. et al. | |

(Continued)

OTHER PUBLICATIONS

Schlumberger, GeoGuard high-performance deepwater safety valves, 2021.

(Continued)

*Primary Examiner* — Matthew R Buck
(74) *Attorney, Agent, or Firm* — Scott Richardson; C. Tumey Law Group, PLLC

(57) ABSTRACT

An insert valve installed, at least partially, in a safety valve that includes a flow port disposed on an exterior of the insert valve, a poppet configured to control a fluid flow through the flow port, a piston rod, disposed uphole from the poppet, configured to move the poppet past at least part of the flow port, where the piston rod includes an upper exposed piston area exposed to an internal volume of the insert valve, and a lower exposed piston area exposed to the internal volume of the insert valve, and a hydraulic control port configured to control movement of the piston rod.

20 Claims, 7 Drawing Sheets

(56) References Cited

U.S. PATENT DOCUMENTS

| | | |
|---|---|---|
| 2019/0353008 A1 | 11/2019 | Lake |
| 2019/0360292 A1 | 11/2019 | Boyd et al. |
| 2020/0056714 A1* | 2/2020 | Mailand ................. E21B 34/14 |
| 2022/0205338 A1 | 6/2022 | Dusterhoft et al. |

OTHER PUBLICATIONS

International Search Report and Written Opinion for International Patent Application No. PCT/US2023/086241 dated Sep. 3, 2024. PDF file. 8 pages.

\* cited by examiner

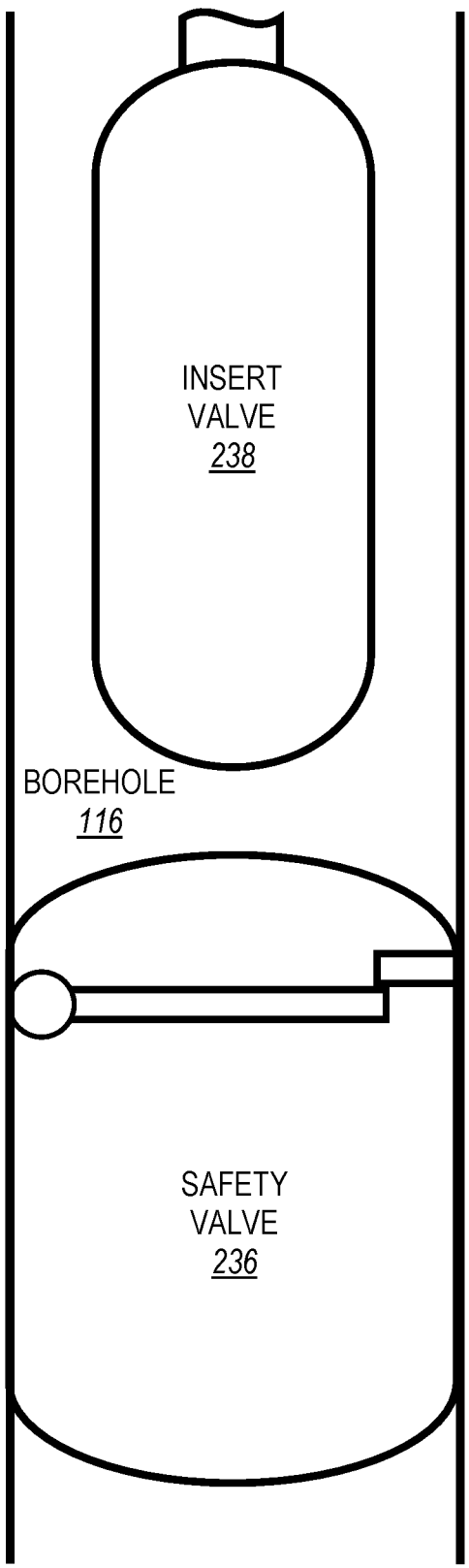
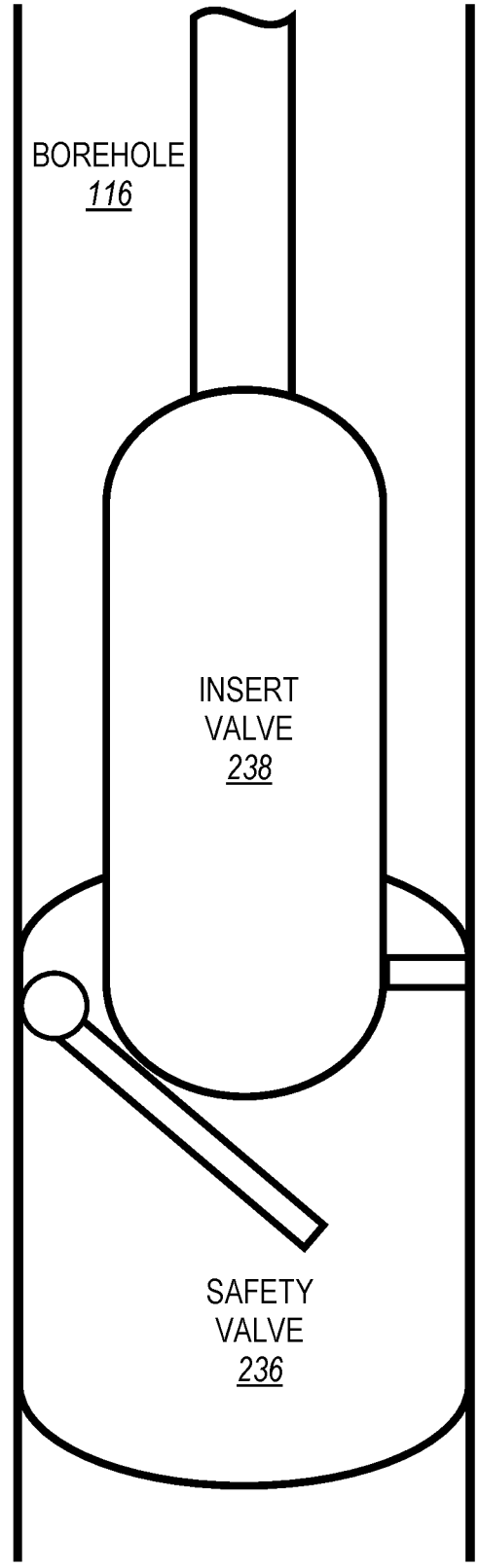
FIG. 2A
FIG. 2B

HIGH FLOW, INSERT SAFETY VALVE, WELL PRESSURE INSENSITIVE

BACKGROUND

The oil and gas industry may use wellbores as fluid conduits to access subterranean deposits of various fluids and minerals which may include hydrocarbons. A drilling operation may be utilized to construct the fluid conduits which are capable of producing hydrocarbons disposed in subterranean formations. Wellbores may be constructed, in increments, as tapered sections, which sequentially extend into a subterranean formation.

A safety valve may be installed to prevent the undesired flow of fluids (e.g., oil, gas, etc.) from a reservoir, up through the borehole, and to the surface. The safety valve may be "normally closed" so that a flapper (or other component thereof) is under passive, uncontrolled, and/or constant force (e.g., via a torsion spring) to move the flapper to the closed position. Thus, in order to open the safety valve, active control (e.g., hydraulic piston) is required to counteract the constant force applied to the flapper. Accordingly, in an emergency situation, hydraulic pressure on the flapper may be quickly removed (if not already released) and the safety valve will automatically close by its own mechanism. Consequently, flow from the reservoir will cease and the emergency situation at the surface may be handled accordingly.

BRIEF DESCRIPTION OF DRAWINGS

These drawings illustrate certain aspects of some examples of the present disclosure and should not be used to limit or define the disclosure.

FIG. 2A is a diagram of an insert valve approaching a safety valve in a borehole.

FIG. 2B is a diagram of an insert valve while partially proceeding into a safety valve.

DETAILED DESCRIPTION

Overview and Advantages

Figure 1:
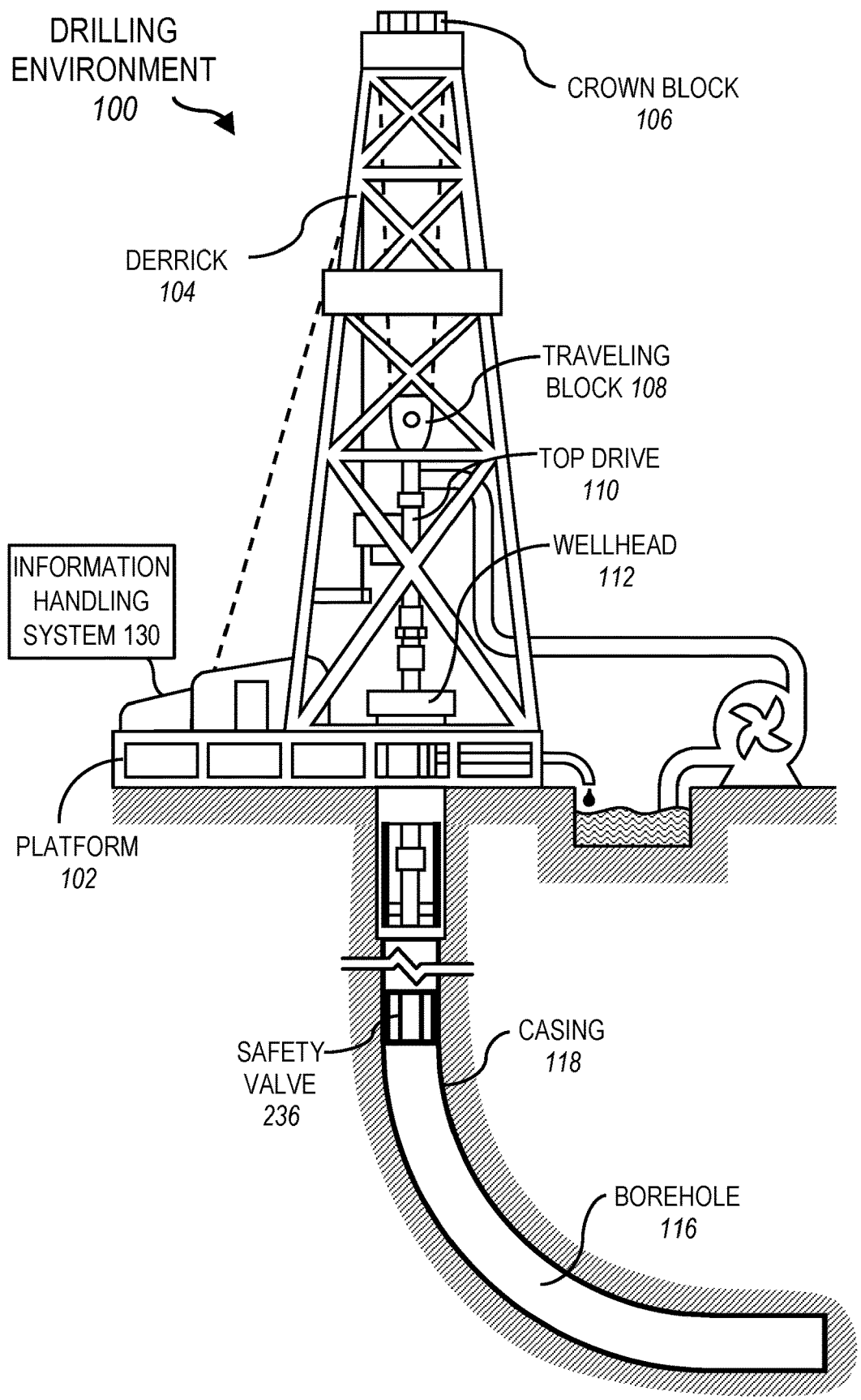
FIG. 1 is a diagram of an example drilling environment.

In general, this application discloses one or more embodiments of methods and systems for an insert valve, installed in an insert valve, that allows for improved fluid flow and control.

In boreholes, a safety valve may be installed to prevent the undesired flow of fluids (e.g., oil, gas, etc.) from a reservoir, up through the borehole, and to the surface. The safety valve may be "normally closed" so that a flapper (or other component thereof) is under passive, uncontrolled, and/or constant force (e.g., via a torsion spring) to move the flapper to the closed position. Thus, in order to open the safety valve, active control is required to counteract the constant force applied to the flapper (e.g., via a hydraulic piston). Accordingly, in an emergency situation, hydraulic pressure on the flapper may be quickly removed (if not already released) and the safety valve will automatically close by its own mechanism. Consequently, flow from the reservoir will cease and the emergency situation at the surface may be handled accordingly.

However, as the safety valve is repeatedly opened and closed (e.g., via a hydraulic piston), the safety valve's internal components may "wear" and not operate as efficiently as designed. Specifically, the flapper (or other closure mechanism) of the safety valve may not close fully (e.g., the spring may have lost some of its ability to keep tension). Consequently, fluids may partially flow around the flapper, even when the safety valve is "closed". Such performance is undesirable as the uncontrolled flow of a reservoir's fluids, even if minimal, may exacerbate an emergency situation at the surface.

When a safety valve loses its ability to properly control the flow of a reservoir's fluid, an insert valve may be installed inside the safety valve, in parallel, to restore proper reservoir fluid control. However, there are several drawbacks from the use of an insert valve.

A first drawback of an insert valve is that the flow rate from the borehole is reduced as the additional components of the insert valve consume volume of the flow path inside the original safety valve. A second drawback is that insert valves are often equipped with similar spring and flapper mechanisms that are prone to the same wear as the original safety valve. Further, at certain depths it becomes impractical, if not impossible, to fabricate a spring capable of overcoming the hydrostatic head (from the weight of the column of liquid in the borehole). A third drawback is that conventional insert valves (as well as other types of valves) often have complicated designs and hydraulic control mechanisms requiring the addition of multiple seals, each of which is prone to wear and leaks.

As disclosed herein, an insert valve is provided that allows for fluid flow greater than conventional insert valves by allowing fluid to flow around the closure mechanism then into the internal volume of the insert valve. The piston that controls the closure is constructed in-line and centered with the closure mechanism. Additionally, the piston (and the hydraulic controls therefor) are disposed uphole from the closure mechanism thereby minimizing the number of hydraulic seals installed in the insert valve.

In any embodiment, the piston may be exposed to the internal volume of the insert valve, at both ends, to neutralize the effect of the pressure on the piston. Further, a pressure chamber may be installed to counteract the forces of a spring mechanism and to allow for control of the insert valve at greater depths.

FIG. 1

FIG. 1 is a diagram of an example drilling environment. Drilling environment 100 may include platform 102 that supports derrick 104 having a traveling block 108 for raising and lowering top drive 110 and drillstring. Top drive 110 supports and rotates drillstring as it is lowered through wellhead 112. In turn, drill bit 124, located at the end of drillstring, may create borehole 116. Each of these components is described below.

Platform 102 is a structure which may be used to support one or more other components of drilling environment 100 (e.g., derrick 104). Platform 102 may be designed and constructed from suitable materials (e.g., concrete) which are able to withstand the forces applied by other components (e.g., the weight and counterforces experienced by derrick 104). In any embodiment, platform 102 may be constructed to provide a uniform surface for drilling operations in drilling environment 100.

Derrick 104 is a structure which may support, contain, and/or otherwise facilitate the operation of one or more pieces of the drilling equipment. In any embodiment, derrick 104 may provide support for crown block 106, traveling block 108, and/or any part connected to (and including) drillstring. Derrick 104 may be constructed from any suitable materials (e.g., steel) to provide the strength necessary to support those components.

Crown block 106 is one or more simple machine(s) which may be rigidly affixed to derrick 104 and include a set of pulleys (e.g., a "block"), threaded (e.g., "reeved") with a drilling line (e.g., a steel cable), to provide mechanical advantage. Crown block 106 may be disposed vertically above traveling block 108, where traveling block 108 is threaded with the same drilling line.

Traveling block 108 is one or more simple machine(s) which may be movably affixed to derrick 104 and include a set of pulleys, threaded with a drilling line, to provide mechanical advantage. Traveling block 108 may be disposed vertically below crown block 106, where crown block 106 is threaded with the same drilling line. In any embodiment, traveling block 108 may be mechanically coupled to drillstring (e.g., via top drive 110) and allow for drillstring (and/or any component thereof) to be lifted from (and out of) borehole 116. Both crown block 106 and traveling block 108 may use a series of parallel pulleys (e.g., in a "block and tackle" arrangement) to achieve significant mechanical advantage, allowing for the drillstring to handle greater loads (compared to a configuration that uses non-parallel tension). Traveling block 108 may move vertically (e.g., up, down) within derrick 104 via the extension and retraction of the drilling line.

Top drive 110 is a machine which may be configured to rotate drillstring. Top drive 110 may be affixed to traveling block 108 and configured to move vertically within derrick 104 (e.g., along with traveling block 108). In any embodiment, the rotation of drillstring (caused by top drive 110) may allow for drillstring to carve borehole 116. Top drive 110 may use one or more motor(s) and gearing mechanism(s) to cause rotations of drillstring. In any embodiment, a rotatory table (not shown) and a "Kelly" drive (not shown) may be used in addition to, or instead of, top drive 110.

Wellhead 112 is a machine which may include one or more pipes, caps, and/or valves to provide pressure control for contents within borehole 116 (e.g., when fluidly connected to a well (not shown)). In any embodiment, during drilling, wellhead 112 may be equipped with a blowout preventer (not shown) to prevent the flow of higher-pressure fluids (in borehole 116) from escaping to the surface in an uncontrolled manner. Wellhead 112 may be equipped with other ports and/or sensors to monitor pressures within borehole 116 and/or otherwise facilitate drilling operations.

Borehole 116 is a hole in the ground which may be formed by a drillstring (and one or more components thereof). Borehole 116 may be partially or fully lined with casing 118.

Casing 118 is concrete and/or metal lining that separates borehole 116 from the surrounding ground. Casing 118 may be used to protect the surrounding ground from the contents of borehole 116, and conversely, to protect borehole 116 from the surrounding ground.

Information handling system 130 is a computing system which may be operatively connected to a drillstring (and/or other various components of the drilling environment). In any embodiment, information handling system 130 may utilize any suitable form of wired and/or wireless communication to send and/or receive data to and/or from other components of drilling environment 100. In any embodiment, information handling system 130 may receive a digital telemetry signal, demodulate the signal, display data (e.g., via a visual output device), and/or store the data. In any embodiment, information handling system 130 may send a signal (with data) to one or more components of drilling environment 100 (e.g., to control one or more tools). In any embodiment, information handling system 130 is a hardware computing device which may be utilized to perform various steps, methods, and techniques disclosed herein (e.g., via the execution of software). In any embodiment, information handling system 130 may include one or more processor(s), cache, memory, storage, and/or one or more peripheral device(s). Any two or more of these components may be operatively connected via a system bus that provides a means for transferring data between those components.

FIG. 2A-2D

Figure 2C:
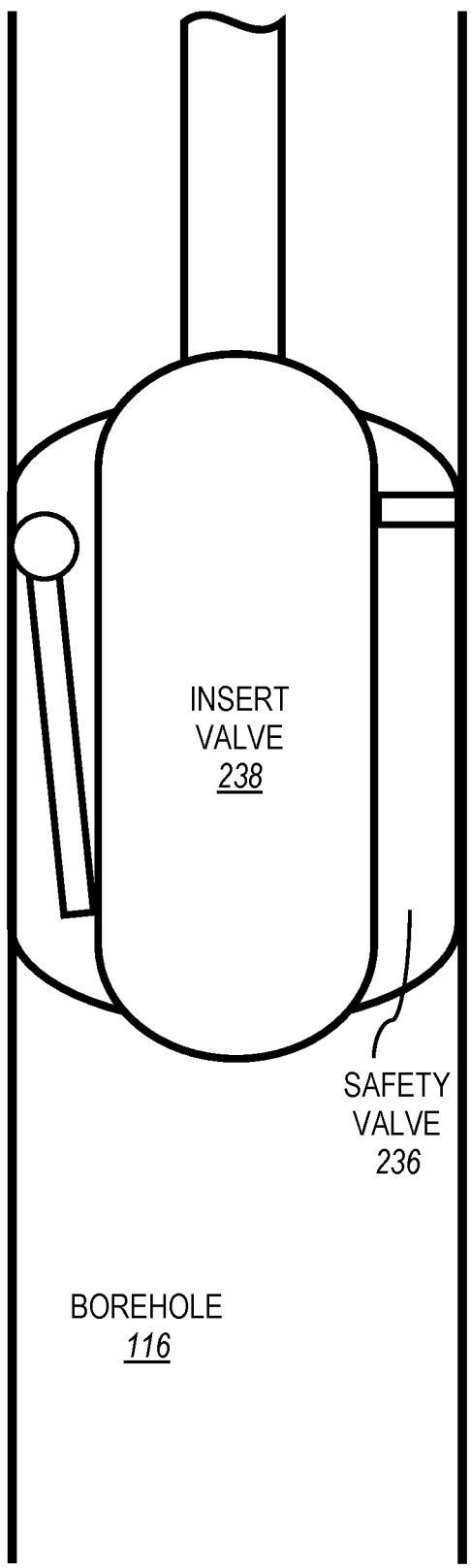
FIG. 2C is a diagram of an insert valve installed in a safety valve, prior to removal of the drillstring.
Figure 2D:
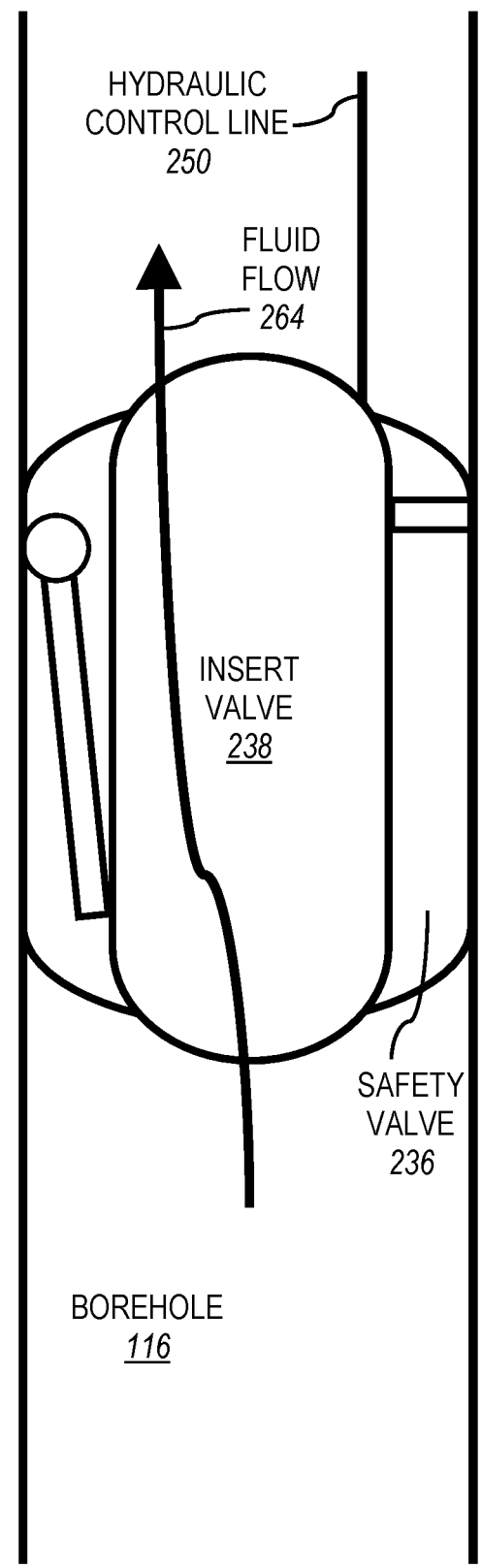
FIG. 2D is a diagram of an insert valve installed in a safety valve with fluid flow.

FIG. 2A is a diagram of an insert valve approaching a safety valve in a borehole. FIG. 2B is a diagram of an insert valve while partially proceeding into a safety valve. FIG. 2C is a diagram of an insert valve installed in a safety valve, prior to removal of the drillstring. FIG. 2D is a diagram of an insert valve installed in a safety valve with fluid flow.

Safety valve 236 is a fail-safe valve that prevents the uncontrolled and/or undesired flow of fluids from a reservoir up through borehole 116. Safety valve 236 may be equipped with a spring-loaded flapper that may be forced open (e.g., via a hydraulic piston) and allow for the flow of fluids. When not held open, the flapper tends to the "closed" position and prevents the flow of fluids from proceeding up borehole 116. In any embodiment, safety valve 236 is installed within casing 118 of borehole 116.

The flapper of a safety valve 236 may wear over time (e.g., due to repeated opening/closing) and not fully close, consequently some fluids may leak through the flapper even when that flapper is not held open. To better control the flow of fluids when safety valve 236 becomes leaky, insert valve 238 may be installed in safety valve to better control the flow of fluid through borehole 116.

Insert valve 238, like safety valve 236, is a fail-safe valve that prevents the uncontrolled and/or undesired flow of fluids from a reservoir up through borehole 116. However, unlike safety valve 236, insert valve 238 is configured to be installed inside safety valve 236. In any embodiment, insert valve 238 may be installed in safety valve 236 by wireline, and/or any other apparatus capable of detachably holding and lowering insert valve 238. After insert valve 238 is installed in safety valve 236, the wireline (and/or some other apparatus) may be detachably removed from insert valve 238.

Hydraulic control line 250 is a hose, tube, and/or other conduit which carries hydraulic fluid. In any embodiment, hydraulic control line 250 carries hydraulic fluid between the surface and hydraulic control port 448. In any embodiment, hydraulic fluid may be pumped (i.e., hydraulic flow 466) into hydraulic control line 250, to hydraulic control port 448, and into upper piston bore 346U. In turn, the hydraulic fluid pumped into upper piston bore 346U causes piston rod 344 to translate towards poppet 354.

Fluid flow 264 is the movement of fluid (e.g., oil, gas, etc.) from a reservoir up through borehole 116, into and through insert valve 238, and up to the surface. Fluid flow 264 may be controlled (e.g., prevented, slowed, allowed) by one or more valve(s) (e.g., safety valve 236, insert valve 238, wellhead 112).

FIGS. 3A-3B

Figure 3A:
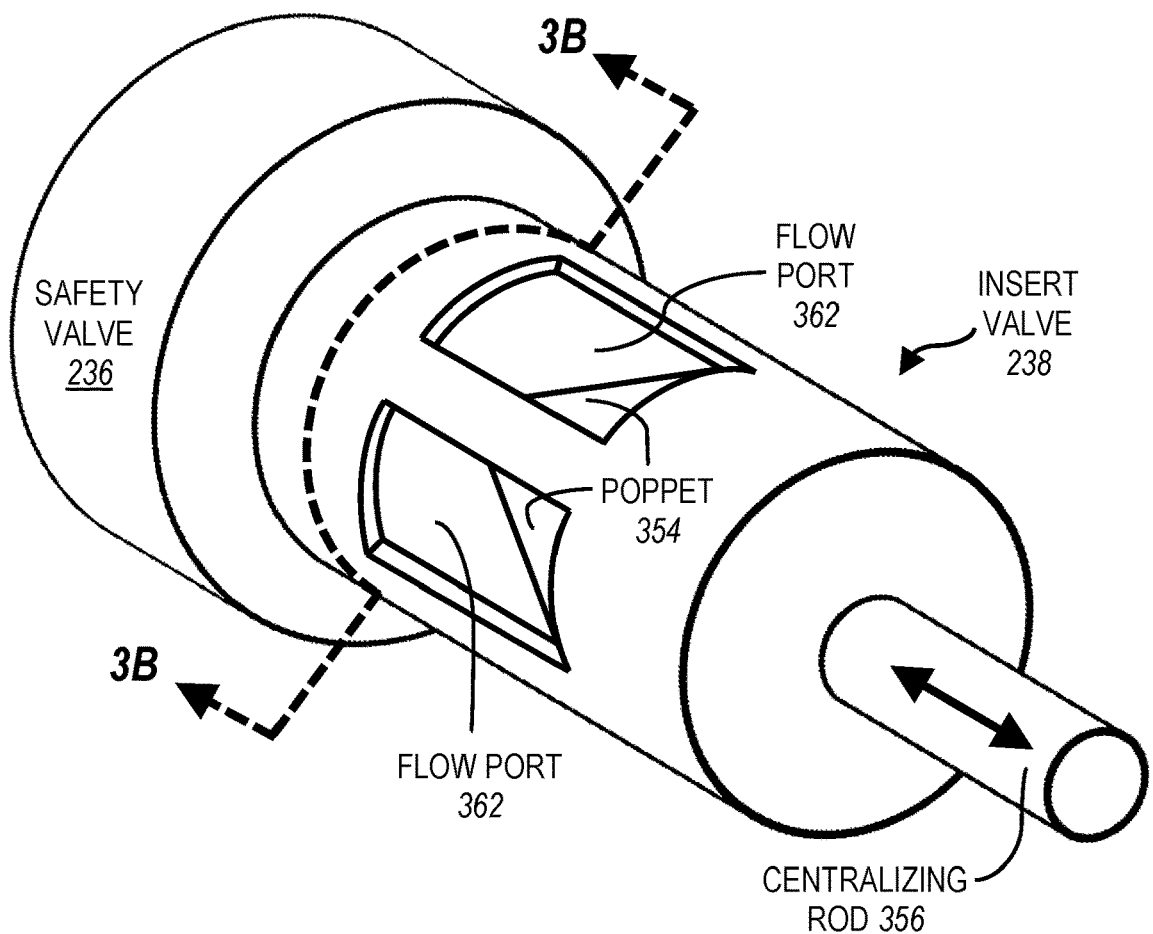
FIG. 3A is a diagram of an insert valve installed in a safety valve.
Figure 3B:
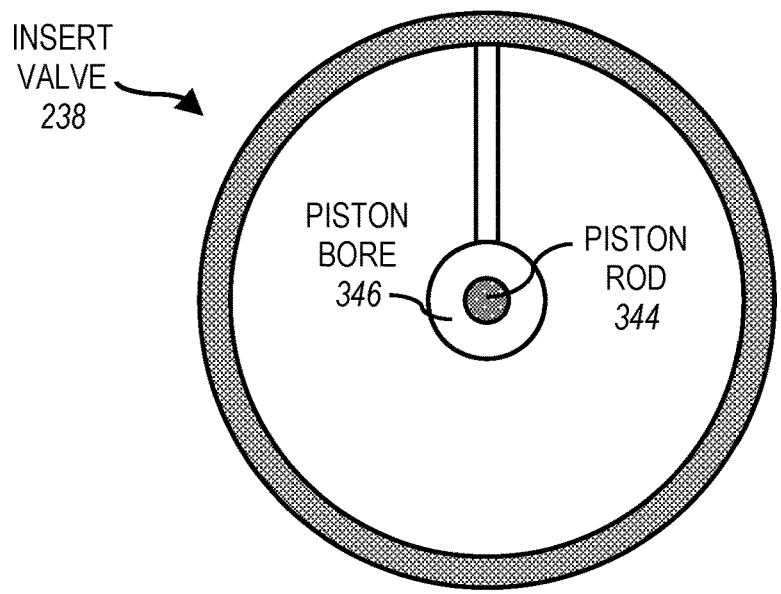
FIG. 3B is a cutaway view of an insert valve facing uphole.

FIG. 3A is a diagram of an insert valve installed in a safety valve. FIG. 3B is a cutaway view of an insert valve facing uphole.

Figure 4A:
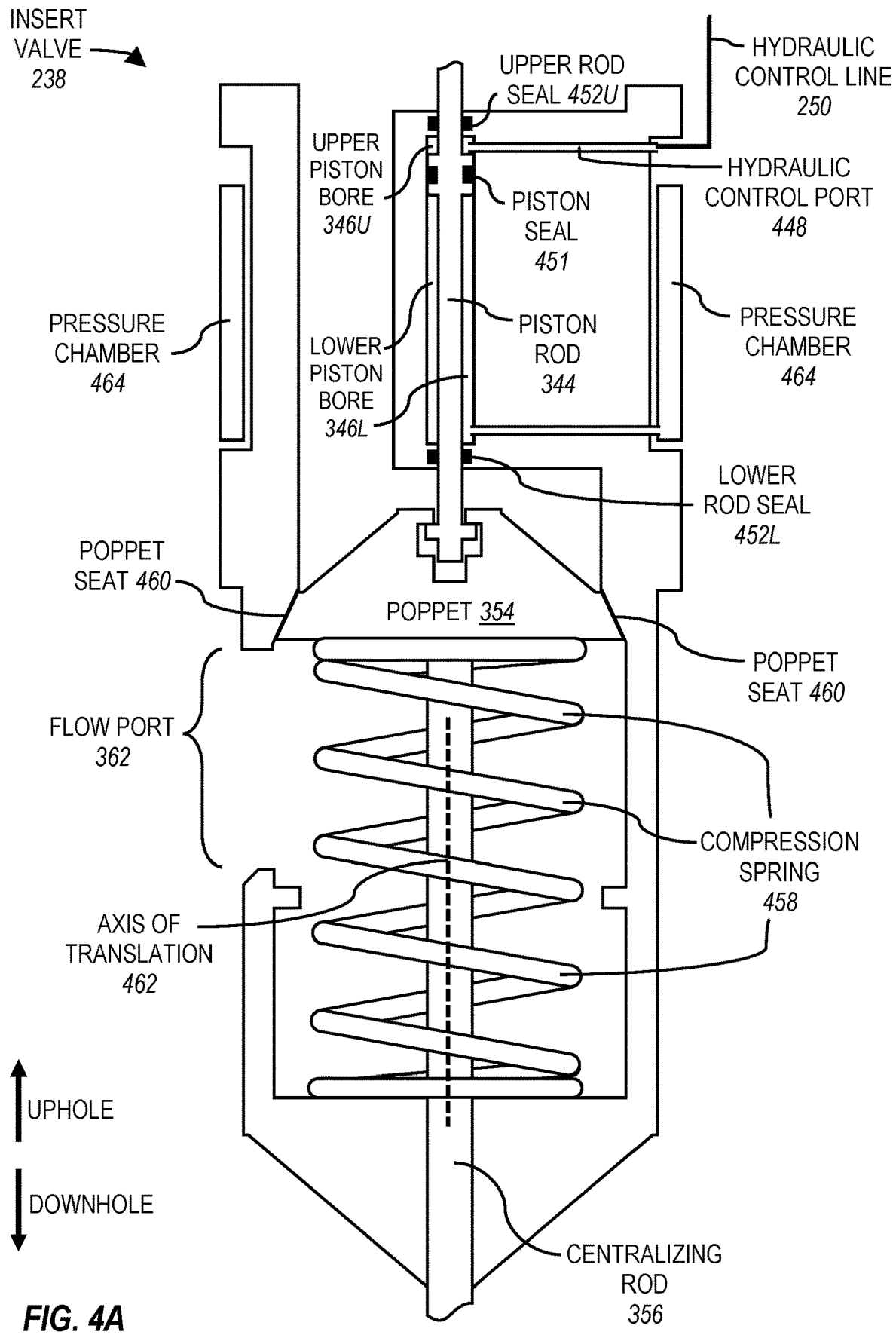
FIG. 4A is a diagram of an insert valve in a closed position.

Piston rod 344 is a rigid structure used to translate force and/or pressure to another body. In any embodiment, piston rod 344 may be controlled to move via hydraulics (e.g., from hydraulic control port 448 and hydraulic control line 250). As shown in FIG. 4A, piston rod 344 may be used to translate force to poppet 354. In any embodiment, piston rod 344 may translate at least partially within piston bore 346. Piston rod 344 may include one or more section(s) with larger diameter which are used to isolate volumes around different sections of piston rod 344 (within piston bore 346). In any embodiment, piston rod 344 may translate along axis of translation 462.

Piston bore 346, generally, is volume that surrounds at least a portion of piston rod 344. In any embodiment, piston bore 346 includes one or more volume(s) (e.g., upper piston bore 346U) that are isolated from volume(s) surrounding piston bore 346 (e.g., the internal volume of insert valve 238). Piston seal 451 may divide piston bore 346 into two internal volumes that are isolated from each other. Upper piston bore 346U is volume into which piston rod 344 may translate and is in fluid connection with hydraulic control port 448. Piston seal 451 may separate the volume of upper piston bore 346U on one side while upper rod seal 452U may separate the volume on the opposite side. In any embodiment, upper piston bore 346U is isolated from the internal volume of insert valve 238 and therefore may have a different pressure within the volume (i.e., that of hydraulic control port 448).

Lower piston bore 346L is volume into which piston rod 344 may translate and is in fluid connection with pressure chamber 464. Piston seal 451 may separate the volume of lower piston bore 346L on one side while lower rod seal 452L may separate the volume on the opposite side. In any embodiment, lower piston bore 346L is isolated from the internal volume of insert valve 238 and therefore may have a different pressure within the volume (i.e., that of pressure chamber 464).

Figure 4B:
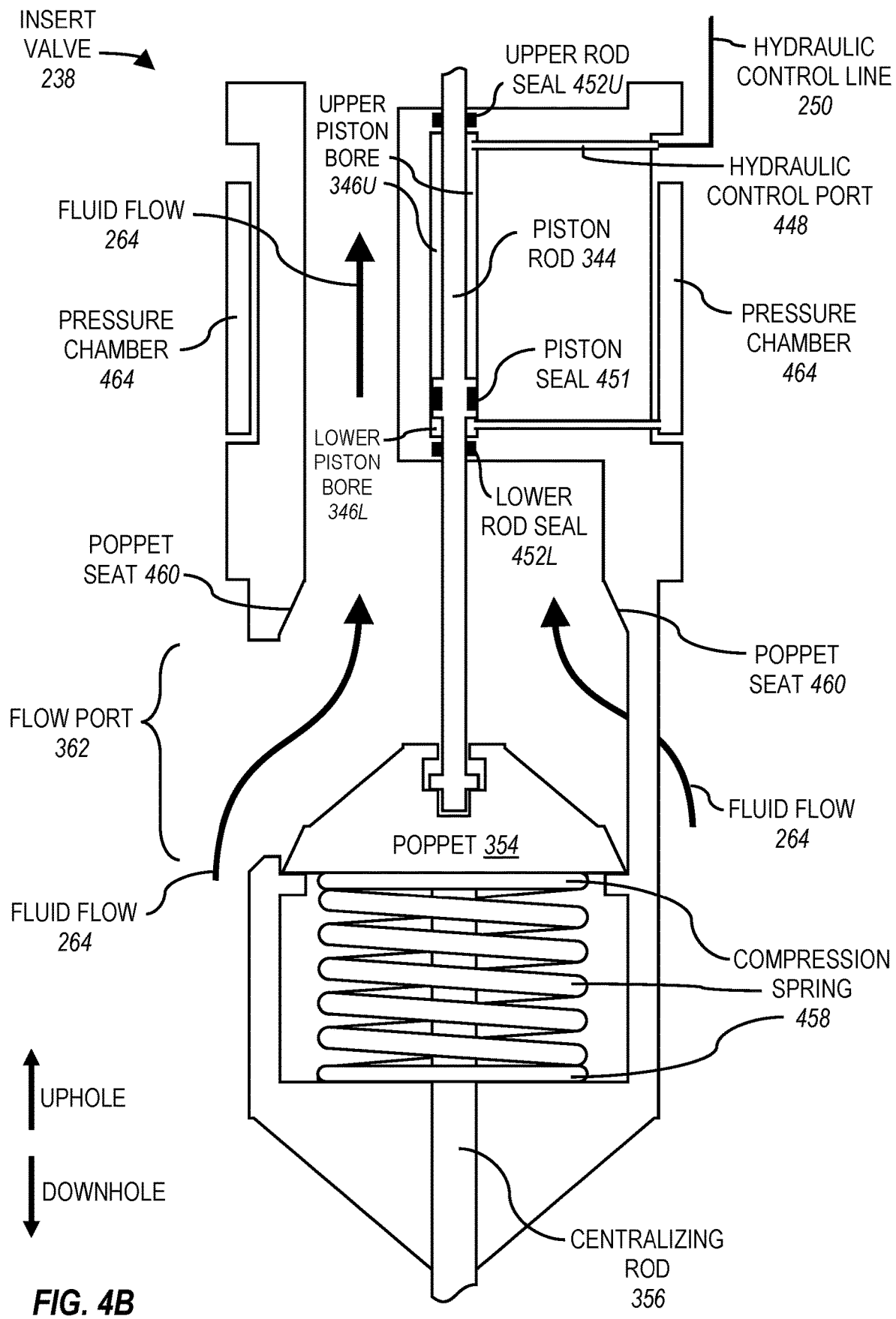
FIG. 4B is a diagram of an insert valve in an open position.

Poppet 354 is a rigid body that translates to "open" or "close" insert valve 238 (i.e., in an "open position" and "closed position" respectively). In any embodiment, poppet 354 translates within the internal volume of insert valve 238 past flow port 262. When poppet 354 is in the "open position" (as shown in FIG. 3A and FIG. 4B), poppet 354 is moved further downhole (by piston rod 344) allowing fluid flow 264 through flow port 262. When poppet 354 is in the "closed position" (as shown in FIG. 4A), poppet 354 may be pressed against poppet seat 460 thereby preventing fluid flow 264 of borehole fluids into insert valve 238. In any embodiment, poppet 354 may translate along axis of translation 462.

Centralizing rod 356 is a rigid body, affixed to poppet 354, which is used to keep poppet 354 aligned with piston rod 344 and insert valve 238, generally. Centralizing rod 356 may slide through an opening (e.g., hole) at the downhole end of insert valve 238. The opening through which centralizing rod 356 translates may be sufficiently lengthy to prevent poppet 354 (and centralizing rod 356) from pivoting away from the axis of translation. In any embodiment, centralizing rod 356 may translate along axis of translation 462.

Flow port 262 is a hole in insert valve 238 which allows for fluid flow 264 when poppet 354 is in the "open" position. Insert valve 238 may have one or more flow port(s) 262 disposed around the circumference of the body. When insert valve 238 is in the "closed" position, flow port 262 is exposed to the underside (or side) of poppet 354 and fluid flow 264 is prevents as there is no pathway from below insert valve 238 to the internal volume of insert valve 238.

FIGS. 4A-B

FIG. 4A is a diagram of an insert valve in a closed position. FIG. 4B is a diagram of an insert valve in an open position.

Hydraulic control port 448 is an opening and/or passage through which hydraulic fluid may be pumped (e.g., from hydraulic control line 250). In any embodiment, hydraulic control port 448 may be built into insert valve 238 (e.g., drilled) with a hole exposed on an exterior surface of the body. The exposed hole may be connected to hydraulic control line 250 to allow for the passage of hydraulic fluids from hydraulic control line 250 and into hydraulic control port 448. On the other end, hydraulic control port 448 opens to upper piston bore 346U.

Piston seal 451 is an apparatus that surrounds piston rod 344 and may have a larger diameter. In any embodiment, piston seal 451 acts to isolate piston bore 346 into two volume(s) (e.g., upper piston bore 346U from a volume below). Accordingly, in any embodiment, upper piston bore 346U may be filled with pressurized hydraulic fluid as piston seal 451 prevents (or limits) hydraulic fluid from leaking into the internal volume of insert valve 238. Conversely, the internal volume of insert valve 238 may be filled with pressurized fluids (e.g., oil) and piston seal 451 prevents (or limits) the flow of the pressurized fluid into upper piston bore 346U.

Rod seal 452 is an apparatus that surrounds piston rod 344 and prevents (or limits) the flow of fluid between piston bore 346 and the internal volume of insert valve 238. Upper rod seal 452U is a rod seal that allows for the translation of piston rod 344 (from upper piston bore 346U to the internal volume of insert valve 238) while maintaining the isolation of upper piston bore 346U from the surrounding volume. Similarly, lower rod seal 452L is a rod seal that allows for the translation of piston rod 344 (from lower piston bore 346L to the internal volume of insert valve 238) while maintaining the isolation of lower piston bore 346L from the surrounding volume.

Compression spring 458 (i.e., "spring"). is a machine that provides constant tension between two bodies. In any embodiment, compression spring 458 may function by tending to an extended state while allowing elastic compression. Thus, when compressed, compression spring 458 exerts outward force (i.e., tension) on the bodies that are exerting inward forces (i.e., compression) on compression spring 458. In any embodiment, compression spring 458 may be used to aide in moving poppet 354 into poppet seat 460 and keeping force thereon. In any embodiment, compression spring 458 may be centered around axis of translation 462.

Poppet seat 460 is a structure of the internal volume of insert valve 238 that forms a seal with poppet 354. In any embodiment, poppet seat 460 may take the form of a tapered wall with geometry that is complementary to at least a portion of poppet 354. Thus, when poppet 354 is mated to poppet seat 460, a seal is formed between the corresponding geometries that sufficiently prevents fluid flow 264.

Axis of translation 462 is the axis along which piston rod 344, poppet 354, and centralizing rod 356 may translate. In any embodiment, axis of translation 462 may be placed centered (or relatively close to) within insert valve 238.

Pressure chamber 464 is a volume that is in fluid contact with lower piston bore 346L. In any embodiment, pressure chamber 464 may be "pre-charged" and filled with a gas (or gas-liquid combination) to maintain a static pressure and allow insert valve 238 to be used at greater depths. That is, in any embodiment, compression spring 458 may limited to a certain size to exert a certain force (with an inability to install a larger, more powerful compression spring 458). As such, there is a depth limitation to the where insert valve 238 may be installed as the hydrostatic head of the liquid prevents compression spring 458 from closing poppet 354. To exert counteracting forces on piston rod 344 due to the depth of insert valve 238, pressure chamber 464 may be "pre-charged" to a pressure that sufficiently neutralizes the change in forces caused by the depth.

Hydraulic flow is the flow of hydraulic fluid between piston bore 346 and the surface via hydraulic control port 448 and hydraulic control line 250. Hydraulic flow may be manually controlled at the surface (e.g., by an operator) to initiate the movement of piston rod 344 and poppet 354 to open insert valve 238. Hydraulic flow may go in either direction depending on the pressure pumped into hydraulic control line 250. When hydraulic fluid is pumped into hydraulic control line 250, hydraulic flow proceeds from the surface to upper piston bore 346U. When the pressure if released from hydraulic control line 250 (i.e., pumping is stopped the hydraulic fluid is allowed to flow back to the surface), hydraulic flow proceeds from upper piston bore 346U to the surface.

FIGS. 5A-C

Figure 5A:
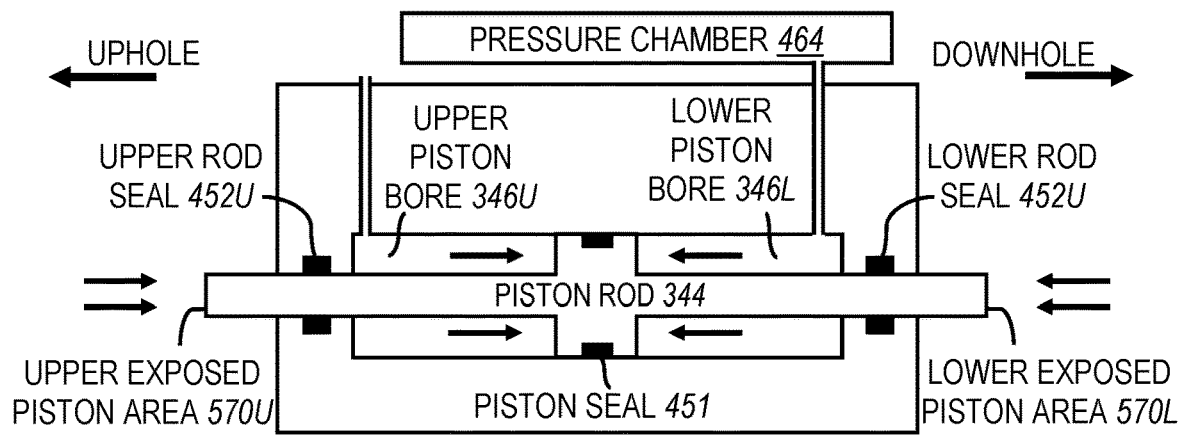
FIG. 5A is a diagram of a piston with equal exposed piston areas.
Figure 5B:
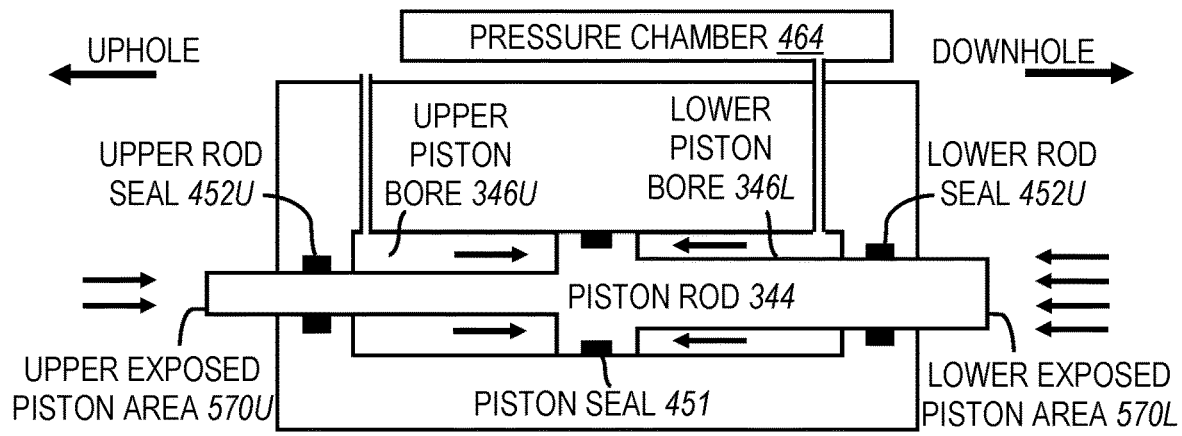
FIG. 5B is a diagram of piston with a larger lower exposed piston area than an upper exposed piston area.
Figure 5C:
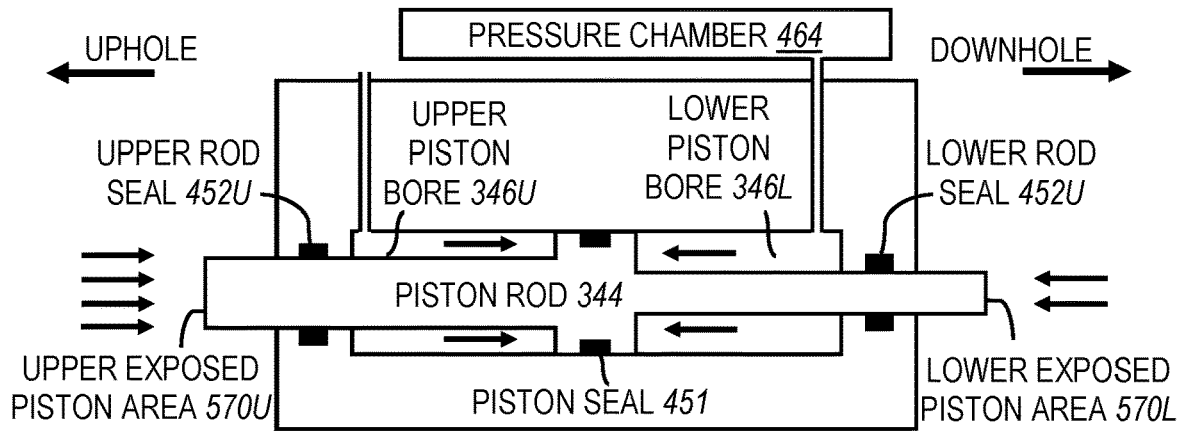
FIG. 5C is a diagram of piston with a larger upper exposed piston area than a lower exposed piston area.

FIG. 5A is a diagram of a piston with equal exposed piston areas. FIG. 5B is a diagram of piston with a larger lower exposed piston area than an upper exposed piston area. FIG. 5C is a diagram of piston with a larger upper exposed piston area than a lower exposed piston area.

Exposed piston area 570, generally, is a cross-sectional area of piston rod 344 that is exposed outside of piston bore 346 to the internal volume of insert valve 238. In any embodiment, piston rod 344 may be exposed on both sides to the internal volume of insert valve 238. Upper exposed piston area 570U is the exposed piston area 570 of piston rod 344 that is directed uphole, most directly traversing through upper rod seal 452U. Lower exposed piston area 570L is the exposed piston area 570 of piston rod 344 that is directed downhole, most directly traversing through lower rod seal 452L.

In any embodiment, upper exposed piston area 570U and lower exposed piston area 570L may be different cross-sectional areas of piston rod 344. As such, the forces exerted on each exposed piston area 570 may differ, even though both are exposed to the same pressure within insert valve 238. That is, as upper piston bore 346U and lower piston bore 346L are isolated from the internal volume of insert valve 238, the forces felt by the distal ends of piston rod 344 may differ based on their exposed piston areas 570.

As a non-limiting example, consider FIG. 5B, where lower exposed piston area 570L (e.g., 0.50 square-inches ($in^2$)) is greater than upper exposed piston area 570U (e.g., 0.25 $in^2$). If the pressure in the internal volume of insert valve 238 is 10,000 pounds-per-square-inch (psi), the force felt by lower exposed piston area 570L would be 5,000 pounds-force (lbf) (i.e., 10,000 psi×0.50 $in^2$) whereas the force felt by upper exposed piston area 570U would be 2,500 lbf (i.e., 10,000 psi×0.25 $in^2$). Thus, in such a scenario, the net force on piston rod 344 (independent of any other factors) would be 2,500 lbf in the uphole direction (as lower exposed piston area 570L receives a greater force). Conversely, as shown in the example of FIG. 5C, upper exposed piston area 570U may be greater than lower exposed piston area 570L to cause a net downhole force on piston rod 344.

Solutions and Improvements

The methods and systems described above are an improvement over the current technology as the methods and systems described herein provide an insert valve that allows for improved fluid flow and control.

Generally, when a safety valve loses its ability to properly control the flow of a reservoir's fluid, an insert valve may be installed inside the safety valve, in parallel, to restore proper reservoir fluid control. However, insert valves suffer from reduced flow rates, components that wear similar to the safety valve, depth restrictions, and complicated designs that are prone to higher maintenance and failure.

As discussed herein, an insert valve is provided that allows for fluid flow greater than conventional insert valves by allowing fluid to flow around the closure mechanism then into the internal volume of the insert valve. The piston that controls the closure is constructed in-line and centered with the closure mechanism to provide a simplified design with greater control. Additionally, the piston (and the hydraulic controls therefor) are disposed uphole from the closure mechanism thereby minimizing the number of hydraulic seals installed in the insert valve. Further, the piston may be exposed to the internal volume of the insert valve, at both ends, to neutralize the effect of the pressure on the piston. A pressure chamber may be installed to counteract the forces of a spring mechanism and to allow for control of the insert valve at greater depths.

Statements

The systems and methods may comprise any of the various features disclosed herein, comprising one or more of the following statements.

Statement 1. An insert valve installed, at least partially, in a safety valve, comprising: a flow port disposed on an exterior of the insert valve; a poppet configured to control a fluid flow through the flow port; a piston rod, disposed uphole from the poppet, configured to move the poppet past at least part of the flow port, wherein the piston rod comprises: an upper exposed piston area exposed to an internal volume of the insert valve; and a lower exposed piston area exposed to the internal volume of the insert valve; and a hydraulic control port configured to control movement of the piston rod.

Statement 2. The insert valve of statement 1, wherein the piston rod translates, at least partially, in a piston bore.

Statement 3. The insert valve of statement 2, wherein a piston seal, disposed on the piston rod, separates the piston bore into an upper piston bore and a lower piston bore.

Statement 4. The insert valve of statement 3, wherein an upper rod seal isolates the upper piston bore from the internal volume of the insert valve, and wherein a lower rod seal isolates the lower piston bore from the internal volume of the insert valve.

Statement 5. The insert valve of statement 4, wherein the hydraulic control port is in a first fluid contact with the upper piston bore.

Statement 6. The insert valve of statement 5, wherein the insert valve further comprises a pressure chamber that is in a second fluid contact with the lower piston bore.

Statement 7. The insert valve of statement 6, wherein the pressure chamber at least partially circumscribes a volume around the insert valve.

Statement 8. The insert valve of statements 3-7, wherein the insert valve further comprises a spring that exerts an upward force on the poppet.

Statement 9. The insert valve of statement 8, wherein a first pressure in the upper piston bore causes a downward force on the piston rod greater than the upward force of the spring.

Statement 10. The insert valve of statement 9, wherein a second pressure in the lower piston bore causes a second upward force on the piston rod such that a net downward force on the piston rod is less than the upward force of the spring.

Statement 11. The insert valve of statements 1-10, wherein the upper exposed piston area is greater than the lower exposed piston area.

Statement 12. The insert valve of statement 11, wherein a pressure in the internal volume of the insert valve causes a net downward force.

Statement 13. The insert valve of statements 1-12, wherein the lower exposed piston area is greater than the upper exposed piston area.

Statement 14. The insert valve of statement 13, wherein a pressure in the internal volume of the insert valve causes a net upward force.

Statement 15. An insert valve installed, at least partially, in a safety valve in a borehole, comprising: a flow port disposed on an exterior of the insert valve; a poppet configured to control a fluid flow through the flow port; a piston rod that translates, at least partially, in a piston bore and is configured to move the poppet past at least part of the flow port; a piston seal, disposed on the piston rod, that separates the piston bore into an upper piston bore and a lower piston bore; a hydraulic control port in a first fluid contact with the upper piston bore; and a pressure chamber that in a second fluid contact with the lower piston bore.

Statement 16. The insert valve of statement 15, wherein the hydraulic control port is uphole from the flow port.

Statement 17. The insert valve of statement 16, wherein the piston rod is configured to move based on a pressure within the upper piston bore.

Statement 18. The insert valve of statements 15-17, wherein the piston rod comprises: an upper exposed piston area exposed to an internal volume of the insert valve; and a lower exposed piston area exposed to the internal volume of the insert valve.

Statement 19. The insert valve of statement 18, wherein the upper exposed piston area is greater than the lower exposed piston area, and wherein a pressure in the internal volume of the insert valve causes a net downward force.

Statement 20. The insert valve of statements 18-19, wherein the lower exposed piston area is greater than the upper exposed piston area, and wherein a pressure in the internal volume of the insert valve causes a net upward force.

General Notes

As it is impracticable to disclose every conceivable embodiment of the technology described herein, the figures, examples, and description provided herein disclose only a limited number of potential embodiments. A person of ordinary skill in the relevant art would appreciate that any number of potential variations or modifications may be made to the explicitly disclosed embodiments, and that such alternative embodiments remain within the scope of the broader technology. Accordingly, the scope should be limited only by the attached claims. Further, the compositions and methods are described in terms of "comprising," "containing," or "including" various components or steps, the compositions and methods may also "consist essentially of" or "consist of" the various components and steps. Moreover, the indefinite articles "a" or "an," as used in the claims, are defined herein to mean one or more than one of the elements that it introduces. Certain technical details, known to those of ordinary skill in the relevant art, may be omitted for brevity and to avoid cluttering the description of the novel aspects.

For further brevity, descriptions of similarly named components may be omitted if a description of that similarly named component exists elsewhere in the application. Accordingly, any component described with respect to a specific figure may be equivalent to one or more similarly named components shown or described in any other figure, and each component incorporates the description of every similarly named component provided in the application (unless explicitly noted otherwise). A description of any component is to be interpreted as an optional embodiment- which may be implemented in addition to, in conjunction with, or in place of an embodiment of a similarly-named component described for any other figure.

Lexicographical Notes

As used herein, adjective ordinal numbers (e.g., first, second, third, etc.) are used to distinguish between elements and do not create any ordering of the elements. As an example, a "first element" is distinct from a "second element", but the "first element" may come after (or before) the "second element" in an ordering of elements. Accordingly, an order of elements exists only if ordered terminology is expressly provided (e.g., "before", "between", "after", etc.) or a type of "order" is expressly provided (e.g., "chronological", "alphabetical", "by size", etc.). Further, use of ordinal numbers does not preclude the existence of other elements. As an example, a "table with a first leg and a second leg" is any table with two or more legs (e.g., two legs, five legs, thirteen legs, etc.). A maximum quantity of elements exists only if express language is used to limit the upper bound (e.g., "two or fewer", "exactly five", "nine to twenty", etc.). Similarly, singular use of an ordinal number does not imply the existence of another element. As an example, a "first threshold" may be the only threshold and therefore does not necessitate the existence of a "second threshold".

As used herein, the word "data" may be used as an "uncountable" singular noun—not as the plural form of the singular noun "datum". Accordingly, throughout the application, "data" is generally paired with a singular verb (e.g., "the data is modified"). However, "data" is not redefined to mean a single bit of digital information. Rather, as used herein, "data" means any one or more bit(s) of digital information that are grouped together (physically or logically). Further, "data" may be used as a plural noun if context provides the existence of multiple "data" (e.g., "the two data are combined").

As used herein, the term "operative connection" (or "operatively connected") means the direct or indirect connection between devices that allows for the transmission of data. For example, the phrase 'operatively connected' may refer to a direct connection (e.g., a direct wired or wireless connection between devices) or an indirect connection (e.g., multiple wired and/or wireless connections between any number of other devices connecting the operatively connected devices).

As used herein, indefinite articles "a" and "an" mean "one or more". That is, the explicit recitation of "an" element does not preclude the existence of a second element, a third element, etc. Further, definite articles (e.g., "the", "said") mean "any one of" (the "one or more" elements) when referring to previously introduced element(s). As an example, there may exist "a processor", where such a recitation does not preclude the existence of any number of other processors. Further, "the processor receives data, and the processor processes data" means "any one of the one or more processors receives data" and "any one of the one or more processors processes data". It is not required that the same processor both (i) receive data and (ii) process data. Rather, each of the steps ("receive" and "process") may be performed by different processors.

As used herein, "machine" means any collection of components assembled to form a tool, structure, or other apparatus. A collection of components may be grouped together and referred to as a single 'machine' based on the functionality of the machine enabled by the combination of the components. As a non-limiting example, a "car engine" is a machine assembled from the components of an engine block, one or more piston(s), a camshaft, etc. that, when combined, function to convert chemical energy into mechanical energy. Further, a machine may be constructed using one or more other machine(s). As a non-limiting example, an automobile may be an assembly of a car engine, a drivetrain, and a steering system—each an independent machine—but assembled to form a larger machine, singularly referred to as an "automobile" which functions to provide transportation.

As used herein, "upward" means in an "uphole" direction and "downward" means in a "downhole" direction. Further, "uphole" refers to an area of the borehole that is more proximate to the surface (when navigating through the borehole) than a "downhole" area of the borehole. That is, although a borehole may vary in depth and come (relatively) "closer" to the surface, a section is only considered "uphole" when traveling along the path of the borehole.

What is claimed is:

1. An insert valve installed, at least partially, in a safety valve, comprising:
    a flow port disposed on an exterior of the insert valve;
    a poppet configured to control a fluid flow through the flow port;
    a piston rod, disposed uphole from the poppet, configured to move the poppet past at least part of the flow port, wherein the piston rod comprises:
        an upper exposed piston area exposed to an internal volume of the insert valve; and
        a lower exposed piston area exposed to the internal volume of the insert valve,
        wherein the piston rod translates, at least partially, in a piston bore;
    a hydraulic control port configured to control movement of the piston rod;
    a piston seal, disposed on the piston rod, that separates the piston bore into an upper piston bore and a lower piston bore;
    an upper rod seal that isolates the upper piston bore from the internal volume of the insert valve; and
    a lower rod seal that isolates the lower piston bore from the internal volume of the insert valve.

2. The insert valve of claim 1, wherein the hydraulic control port is in a first fluid contact with the upper piston bore.

3. The insert valve of claim 2, wherein the insert valve further comprises a pressure chamber that is in a second fluid contact with the lower piston bore.

4. The insert valve of claim 3, wherein the pressure chamber at least partially circumscribes a volume around the insert valve.

5. The insert valve of claim 1, wherein the insert valve further comprises a spring that exerts an upward force on the poppet.

6. The insert valve of claim 5, wherein a first pressure in the upper piston bore causes a downward force on the piston rod greater than the upward force of the spring.

7. The insert valve of claim 6, wherein a second pressure in the lower piston bore causes a second upward force on the piston rod such that a net downward force on the piston rod is less than the upward force of the spring.

8. An insert valve installed, at least partially, in a safety valve, comprising:
    a flow port disposed on an exterior of the insert valve;
    a poppet configured to control a fluid flow through the flow port;
    a piston rod, disposed uphole from the poppet, configured to move the poppet past at least part of the flow port, wherein the piston rod comprises:
        an upper exposed piston area exposed to an internal volume of the insert valve; and
        a lower exposed piston area exposed to the internal volume of the insert valve,
        wherein the upper exposed piston area is greater than the lower exposed piston area; and
    a hydraulic control port configured to control movement of the piston rod.

9. The insert valve of claim 8, wherein a pressure in the internal volume of the insert valve causes a net downward force.

10. The insert valve of claim 8, wherein the insert valve further comprises a spring that exerts an upward force on the poppet.

11. The insert valve of claim 10, wherein a pressure in the internal volume of the insert valve causes a downward force on the piston rod greater than the upward force of the spring.

12. An insert valve of installed, at least partially, in a safety valve, comprising:
    a flow port disposed on an exterior of the insert valve;
    a poppet configured to control a fluid flow through the flow port;
    a piston rod, disposed uphole from the poppet, configured to move the poppet past at least part of the flow port, wherein the piston rod comprises:

an upper exposed piston area exposed to an internal volume of the insert valve; and a lower exposed piston area exposed to the internal volume of the insert valve, wherein the lower exposed piston area is greater than the upper exposed piston area; and a hydraulic control port configured to control movement of the piston rod.

13. The insert valve of claim 12, wherein a pressure in the internal volume of the insert valve causes a net upward force.

14. The insert valve of claim 12, wherein the insert valve further comprises a spring that exerts an upward force on the poppet.

15. An insert valve installed, at least partially, in a safety valve in a borehole, comprising:
   a flow port disposed on an exterior of the insert valve;
   a poppet configured to control a fluid flow through the flow port;
   a piston rod that translates, at least partially, in a piston bore and is configured to move the poppet past at least part of the flow port, wherein the piston rod comprises:
      an upper exposed piston area exposed to an internal volume of the insert valve; and
      a lower exposed piston area exposed to the internal volume of the insert valve,
      wherein the upper exposed piston area is greater than the lower exposed piston area, and
      wherein a pressure in the internal volume of the insert valve causes a net downward force; and
   a piston seal, disposed on the piston rod, that separates the piston bore into an upper piston bore and a lower piston bore;
   a hydraulic control port in a first fluid contact with the upper piston bore; and
   a pressure chamber that in a second fluid contact with the lower piston bore.

16. The insert valve of claim 15, wherein the hydraulic control port is uphole from the flow port.

17. The insert valve of claim 16, wherein the piston rod is configured to move based on a pressure within the upper piston bore.

18. An insert valve installed, at least partially, in a safety valve in a borehole, comprising:
   a flow port disposed on an exterior of the insert valve;
   a poppet configured to control a fluid flow through the flow port;
   a piston rod that translates, at least partially, in a piston bore and is configured to move the poppet past at least part of the flow port, wherein the piston rod comprises:
      an upper exposed piston area exposed to an internal volume of the insert valve; and
      a lower exposed piston area exposed to the internal volume of the insert valve,
      wherein the lower exposed piston area is greater than the upper exposed piston area, and
      wherein a pressure in the internal volume of the insert valve causes a net upward force; and
   a piston seal, disposed on the piston rod, that separates the piston bore into an upper piston bore and a lower piston bore;
   a hydraulic control port in a first fluid contact with the upper piston bore; and
   a pressure chamber that in a second fluid contact with the lower piston bore.

19. The insert valve of claim 18, wherein the hydraulic control port is uphole from the flow port.

20. The insert valve of claim 19, wherein the piston rod is configured to move based on a pressure within the upper piston bore.

* * * * *